United States Patent [19] [11] 4,223,822

Clitheroe [45] Sep. 23, 1980

[54] YARN COMPENSATOR FOR A MULTICOLOR YARN WARP PRINTER

[75] Inventor: Thomas Clitheroe, Blackburn, England

[73] Assignee: Edgar Pickering (Blackburn) Limited, Lancashire, England

[21] Appl. No.: 928,407

[22] Filed: Jul. 27, 1978

Related U.S. Application Data

[63] Continuation-in-part of Ser. No. 817,860, Jul. 21, 1977, abandoned.

[30] Foreign Application Priority Data

Jul. 26, 1976 [GB] United Kingdom ............... 31087/76

[51] Int. Cl.[3] ...................... B65H 17/42; G11B 15/56

[52] U.S. Cl. ................................................ 226/118

[58] Field of Search .............................. 226/34, 42–47, 226/113, 118, 119; 242/36, 37 R

[56] References Cited

U.S. PATENT DOCUMENTS

| | | | |
|---|---|---|---|
| 3,640,440 | 2/1972 | Sedlarik et al. | 226/34 |
| 4,009,814 | 3/1977 | Singh | 226/113 |

*Primary Examiner*—Leonard D. Christian

*Attorney, Agent, or Firm*—Watson, Cole, Grindle & Watson

[57] ABSTRACT

The combination, with a source of supply of a warp of yarns and a mechanism for operating on the yarns, of a yarn compensator which stores yarn and is disposed between the source and the operating mechanism, the compensator including feed rollers operative to draw the yarns from the source at a greater rate than it can be accepted by the operating mechanism and means for driving the feed rollers, and a detector for detecting faults in the ends of yarn in the source, said detector being operative on detection of a fault to stop the feed rollers and to cause the operating mechanism to run at a lower speed.

8 Claims, 5 Drawing Figures

YARN COMPENSATOR FOR A MULTICOLOR YARN WARP PRINTER

This application is a continuation-in-part application of U.S. application Ser. No. 817,860, filed July 21, 1977, now abandoned.

BACKGOUND OF THE INVENTION

The conventional multicolour yarn warp printing apparatus includes a printer having feed rollers for drawing a warp of yarns from a creel and printing rollers arranged to print successive lengths of each yarn in different colours, the printer being followed by a steamer, a washer and a dryer, through which the yarns pass in succession on their way to a beamer.

Yarn faults sometimes occur in the ends of yarn on the creel, these being either broken ends or tight ends, and drop wires and tight end detectors are provided between the creel and the printer, which automatically stop the machine when a yarn fault is detected, the machine being restarted by the operator when the fault has been corrected.

Stoppage of the machine during yarn correction has the disadvantage that the sections of wet yarn in the printer tend to sag between successive rollers with the result that when the machine is restarted white spots tend to develop in the yarns between the coloured zones.

THE PRESENT INVENTION

The invention provides the combination, with a source of supply of a warp of yarns and a mechanism for operating on the yarns, of a yarn compensator which stores yarn and is disposed between the source and the operating mechanism, the compensator including feed rollers operative to draw the yarns from the source at a greater rate than it can be accepted by the operating mechanism and means for driving the feed rollers, and a detector for detecting faults in the ends of yarn in the source, the detector being operative on detection of a fault to stop the feed rollers and to cause the operating mechanism to run at a lower speed.

In the embodiment hereinafter described the yarn compensator is interposed between the creel and the printer of a multicolour warp printing apparatus and the above difficulty is overcome because the printer continues to run at reduced speed while the yarn fault is being rectified with the result that tension on the yarns in the printer is maintained while yarn is being withdrawn from the reserve stored in the compensator. The apparatus continues to run at slow speed drawing yarns from the compensator while faults are being corrected and can be switched by the operator to normal running when the correction has been made.

In a typical case, the normal speed of travel of yarn through the machine may be 70 ft. per minute, the reduced speed of travel 10 ft. per minute, and the length of yarn warp sheet stored in the compensator 52 ft.

The compensator has, however, other useful applications. Thus, it may be interposed between a tufting machine and a beamer or creel which supplies a warp of yarns to the tufting machine. When a yarn fault is detected, the tufting machine will run at low speed during correction of the fault. Any defects in the portion of the tufted fabric made during this period and arising from the fault can afterwards be corrected by use of a conventional repair gun.

In its preferred form, the compensator includes, in addition to the feed rollers for drawing the yarns from the source which are stopped when a fault is detected, upper and lower vertically movable carriages which are so coupled that movement of each carriage in either direction is accompanied by equal movement of the other carriage in the opposite direction, and rollers disposed alternately on the upper and lower carriages between which the yarns may hang in festoons to provide the reserve of yarn required to permit of low speed operation of the following mechanism during correction of faults.

One embodiment of yarn compensator according to the invention will now be described in detail, by way of example, with reference to the accompanying drawings.

DETAILED DESCRIPTION OF A PREFERRED EMBODIMENT

Figure 1:
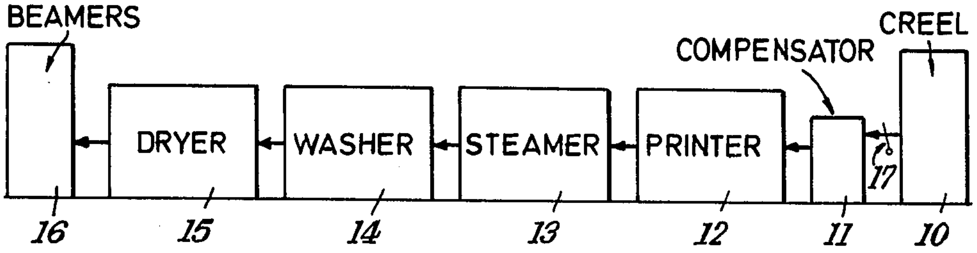
FIG. 1 is a diagram showing the relationship between the yarn compensator and other parts of a multicolour warp printer.
Figure 4:
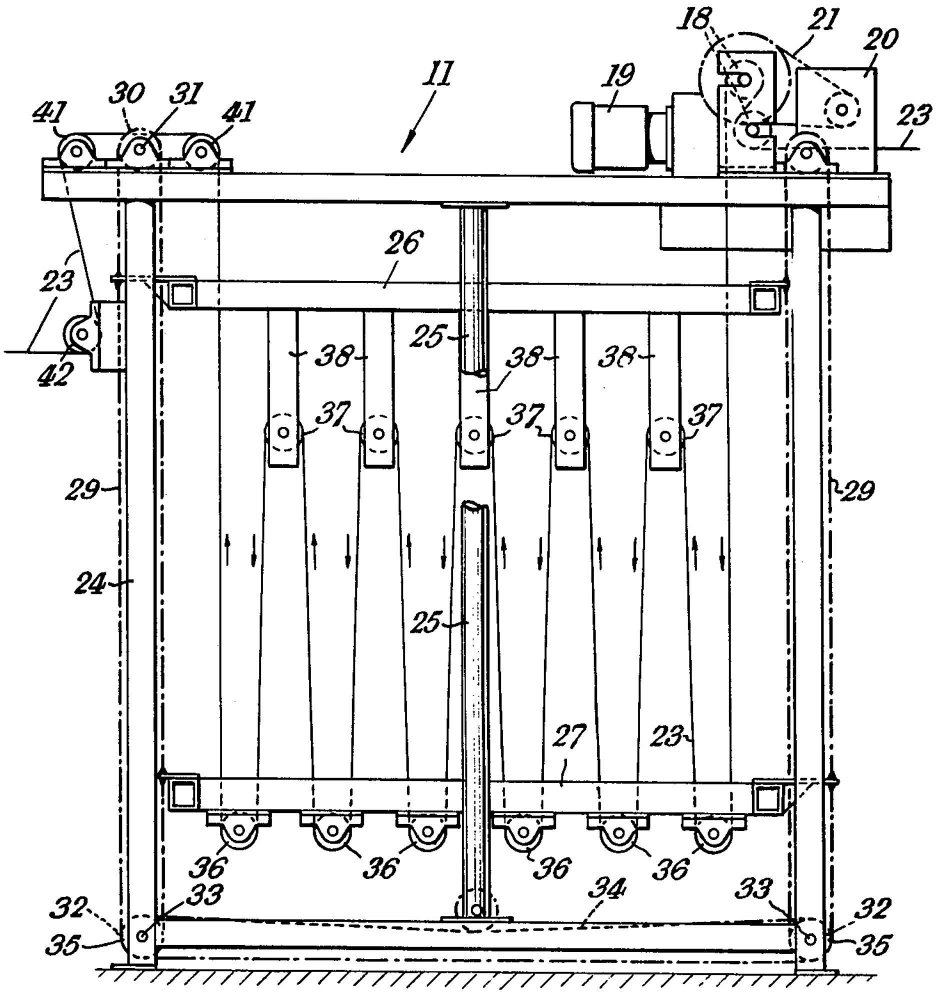
FIG. 4 is a view similar to FIG. 3, but on a smaller scale, showing the compensator in a working position.
Figure 2:
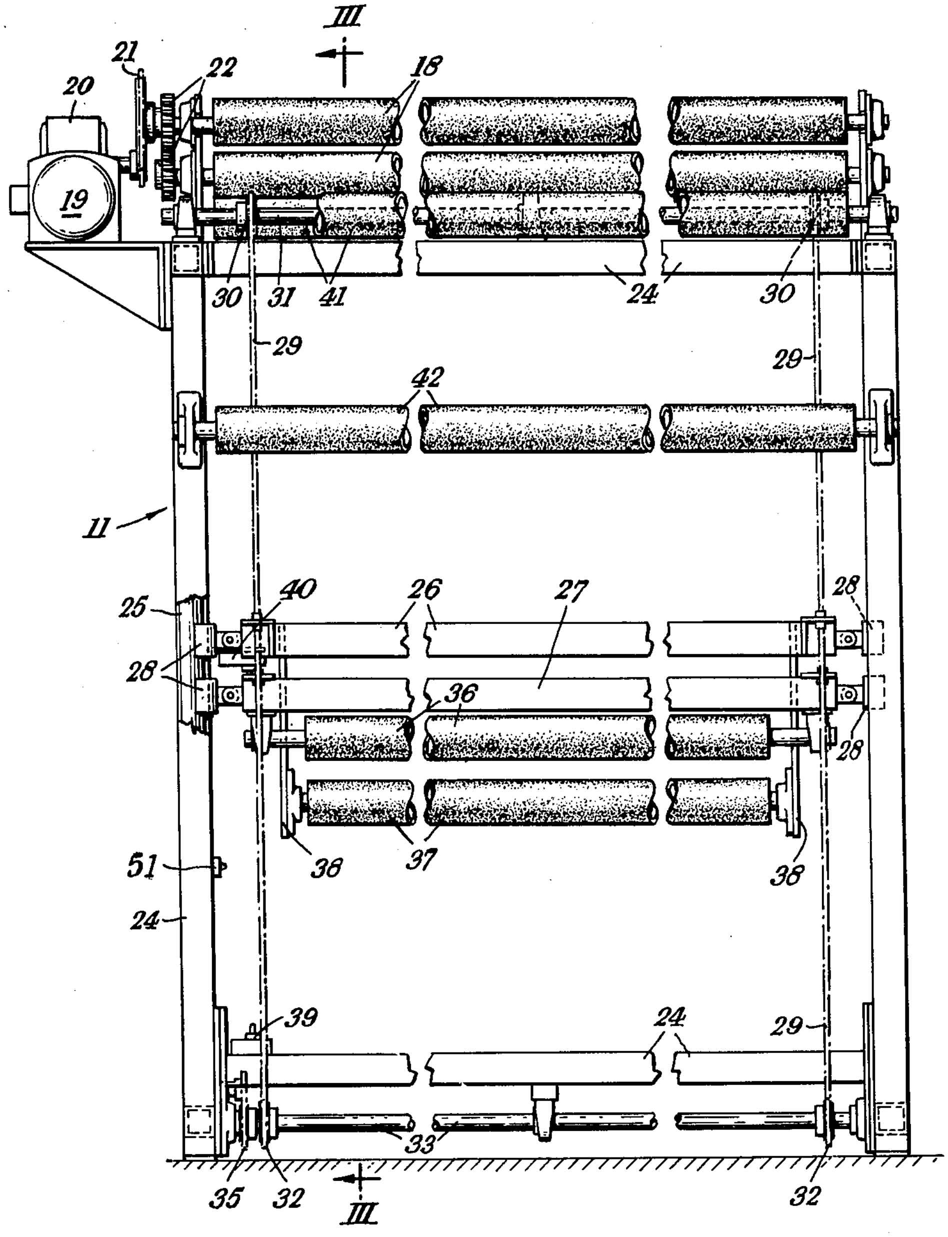
FIG. 2 is an elevation, partly in section, showing the delivery end of the yarn compensator.
Figure 3:
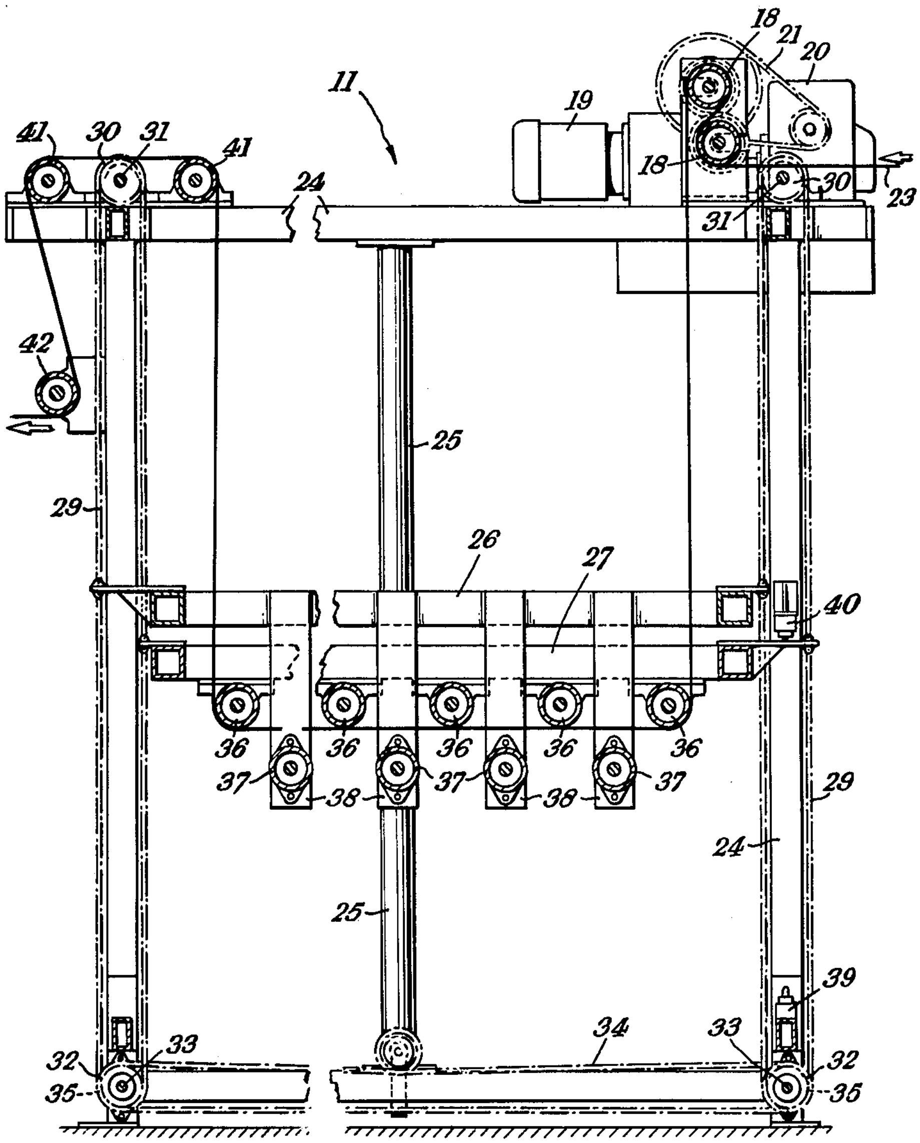
FIG. 3 is a section on the line III—III in FIG. 2 showing carriages in the compensator at minimum spacing.
Figure 5:
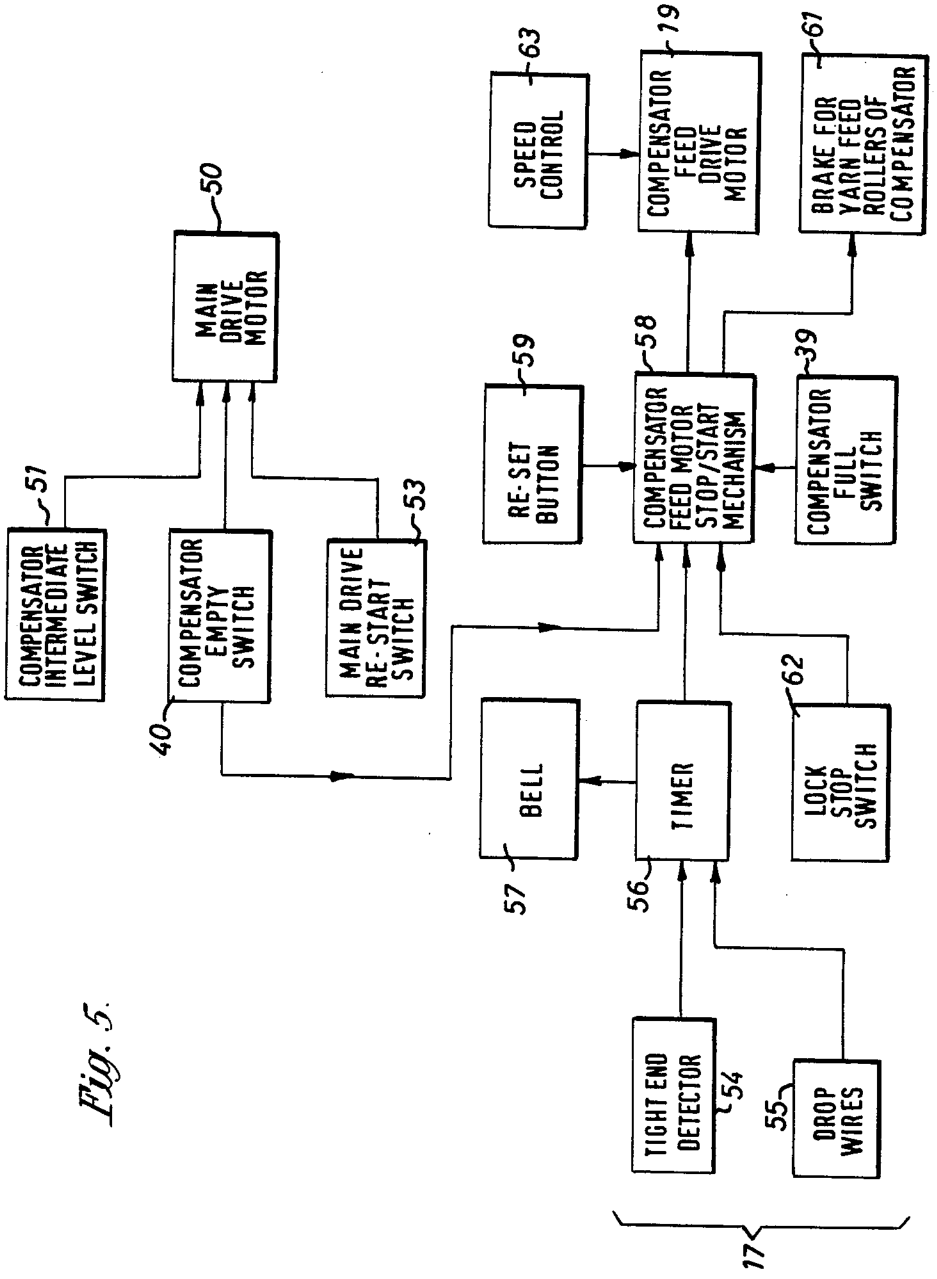
FIG. 5 is a block circuit diagram.

The apparatus shown in FIG. 1 comprises a creel 10, from which a warp of yarns passes through the compensator 11, shown in detail in FIGS. 2 to 4, to a printer 12 and thence, through a steamer 13, a washer 14 and a dryer 15, to beamers 16. A conventional yarn fault detector 17 is disposed between the creel 10 and the compensator 11. The mechanism following the compensator 11 is driven by an electric motor 50 (FIG. 5).

As shown in FIGS. 2 to 4, the compensator 11 includes feed rollers 18, driven by an electric motor 19 through a gear box 20 and a chain drive 21 and carrying meshing gears 22. The rollers 18 are normally driven at a speed such that yarns 23 are drawn from the creel 10 at a greater speed than it can be accepted by the printer 12 and the following mechanisms. In the event of a yarn fault, and as described more fully below, the detector 17 stops the feed rollers 18 only but does not stop the printer 12 and the following mechanisms. These mechanisms continue to run but at a reduced speed.

The compensator 11 has a framework 24, which supports the feed rollers 18 and the above described mechanism for driving them and includes at each end a vertical guide post 25. Upper and lower carriages 26, 27 carry at their ends fittings 28 which are slidable on the posts 25. The ends of the carriages 26, 27 are connected by chains 29 which extend around upper sprockets 30 on shafts 31 and lower sprockets 32 on shafts 33. Another chain 34 extends around sprockets 35 on the shafts 33. Upward movement of one of carriages 26, 27 is accordingly accompanied by equal downward movement of the other carriage.

The lower carriage 27 carries six rollers 36 on its undersurface and the upper carriage 26 carries five rollers 37 mounted on brackets 38 depending from it and disposed between and at a lower level than the rollers 36 when the carriages are at a minimum spacing from one another as shown in FIG. 3. In this condition the yarns 23 extend horizontally in contact with the rollers 36 on the lower carriage only. As shown in FIG. 2, the compensator includes three limit switches, viz. a compensator empty switch 40, a compensator full switch 39 and an intermediate level switch 51.

As will be appreciated, the warp of yarns is constituted by a large number of yarns 23 which are fed in parallel through the compensator. After passage over the last roller 36 on the upper carriage 27, the yarns travel upwardly over guide rollers 41 to another guide roller 42 from which the yarns leave the compensator. The travel of the yarns is indicated by the arrows in FIG. 3.

When the machine is started in normal operation in the condition shown in FIG. 3, the yarn feed rollers 18 feed yarn faster than it can be accepted by the following mechanisms driven by the main drive motor 50 so that the upper carriage 26 begins to rise and the lower carriage 27 to descend with the yarns extending in festoons between successive rollers on the two carriages to form a reserve as shown in FIG. 4. When the carriages have separated to a maximum extent the switch 39 is operated. This sends a signal to a mechanism 58 (FIG. 5) which causes said mechanism to switch off the motor 19 driving the feed rollers 18. The following mechanisms continue to be driven at full speed by the motor 50 to diminish gradually the reserve of yarn and after a few seconds the switch 39 removes the signal from the mechanism 58 to allow the motor 19 to restart.

As shown in FIG. 5, the yarn fault detector 17 includes a tight end detector 54 and drop wires 55. If the tight end detector 54 detects a tight yarn on the creel or if the drop wires 55 detect a slack or broken yarn, the detector in question passes a signal to a timer 56 which commences operation and at the same time a bell 57 starts ringing. If the tight end detector 54 or the drop wires 55 should cease operation within a period set by the timer 56, generally 1 to 2 seconds, then the bell stops, the timer resets itself and no other effects occur.

If, however, the tight end detector 54 or the drop wires 55 should continue to provide a signal to the timer 56 after the period of 1 or 2 seconds then the timer passes a signal to a compensator feed motor stop mechanism 58, which stops the compensator feed drive motor 19. The motor 50 continues to draw yarn from the compensator until the lower carriage 27 has risen sufficiently to operate the switch 51, which causes the motor 50, which normally withdraws yarn from the compensator at a rate of 70 feet per minute, to reduce its speed and withdraw the yarn at a lower rate of 10 feet per minute. After the yarn fault has been corrected, a reset button 59 is operated to restart the compensator feed drive motor 19. As the level of the lower carriage 27 falls, the switch 51 is released to allow the motor 50 to resume running at full speed.

If the motor 50 is allowed to run at low speed during correction of a fault until the reserve of yarn in the compensator becomes exhausted, the limit switch 40 is operated by approach of the carriages and this causes the motor 50 to stop.

If, for any reason, the switch 40 should be operated while the motor 19 is running, this motor is stopped by a signal from the switch 40. As the drive motor 19 is halted, a brake 61 for the yarn feed rollers 18 is also applied. In an emergency, the motor 19 can be stopped by operation of a lock-stop switch 62. A speed control 63 is provided for the motor 19 by which the speed of this motor may be varied.

What I claim as my invention and desire to secure by Letters Patent is:

1. In an apparatus for conveying a warp of yarns from a yarn supply means to an apparatus capable of operating on said yarns, said operaing apparatus being driven by a motor means, the improvement wherein a yarn compensator which stores yarn is disposed between said yarn supply means and the operating mechanism, the compensator including feed rollers operative to draw the yarns from the yarn supply means and means for driving said feed rollers to feed the yarns at a greater rate than they can be accepted by said operating mechanism, a detector disposed between said yarn supply means and said feed rollers for detecting faults in the ends of yarn drawn from said yarn supply means, and an electrical control system operative on detection of a fault by said detector to stop the means driving said feed rollers and to cause said motor to run at a lower speed.

2. The apparatus as claimed in claim 1, wherein said yarn supply means is a creel and said operating mechanism is a printer.

3. The apparatus as claimed in claim 1, wherein said yarn supply means is a beamer and said operating mechanism is a tufting machine.

4. The apparatus as claimed in claim 1, wherein said yarn supply means is a creel and said operating mechanism is a tufting machine.

5. The apparatus as claimed in claim 1, wherein said yarn compensator comprises upper and lower vertically movable carriages, a coupling mechanism between the carriages providing for movement of each carriage in either direction to be accompanied by equal movement of the other carriage in the opposite direction, and rollers disposed alternately on the upper and lower carriages between which the yarns may hang in festoons to provide a reserve of yarns to enable continued operation of said operating mechanism when said feed rollers are stopped.

6. The apparatus according to claim 5, wherein said yarn compensator comprises a framework including a pair of vertical guide pillars on which fittings on the ends of the carriages are slidable and in which fittings on the ends of the carriages are slidable and in which said coupling mechanism comprising chains connected to the carriages and extending over sprockets on the framework.

7. The apparatus according to claim 5, wherein said electrical control system includes a second motor driving said feed rollers, a mechanism responsive to signals from said detector and operative to stop said second motor, and a switch operable by one of said carriages in response to withdrawal of yarn from said compensator subsequent to stoppage of said second motor to cause said motor driving said operating mechanism to run at its lower speed.

8. The apparatus according to claim 7, wherein said electrical control system includes a timer interposed between said detector and said responsive mechanism for delaying response of said responsive mechanism to signals from the detector.

* * * * *